Oct. 20, 1942.  A. B. WEBB  2,299,367
SAFETY VALVE
Filed Aug. 3, 1940  2 Sheets-Sheet 1

Inventor
Arthur B. Webb

Oct. 20, 1942.  A. B. WEBB  2,299,367
SAFETY VALVE
Filed Aug. 3, 1940  2 Sheets-Sheet 2

Inventor
Arthur B. Webb

Patented Oct. 20, 1942

2,299,367

UNITED STATES PATENT OFFICE 2,299,367

SAFETY VALVE

Arthur B. Webb, Milwaukee, Wis., assignor to Cream City Boiler Company, Milwaukee, Wis., a corporation of Wisconsin Application August 3, 1940, Serial No. 350,301

1 Claim. (Cl. 277—45)

This invention relates to valves and refers particularly to safety valves of the type used in conjunction with closed storage tanks. The venting of closed tanks, especially those used for milk storage and transportation has always presented a problem.

Tanks of this nature are very expensive. Consequently, it is of utmost importance that reliable provision be made for guarding against bursting or collapse of the tank which will occur during forced filling and emptying of the tank without first opening an adequate vent. The mere provision of a manually controlled valve will suffice but its dependence upon the human element makes it unreliable. Many instances are known where tanks have burst or collapsed because the attendant failed to open the vent before filling or emptying of the tank.

The inconvenience occasioned by the necessity for manual attention also has lead to the unsanitary habit of leaving the valve open at all times.

It is, of course, also possible to supply separate pressure relief and vacuum relief valves; but this would necessitate separate openings through the tank wall which is objectionable especially in jacketed tanks.

Another requirement for any valve used in conjunction with milk storage and transportation tanks is that all parts thereof must be quickly and easily accessible. The entire valve structure must be capable of being quickly disassembled and assembled and all portions thereof must be so constructed that they may be readily sterilized.

With these objectives in view, the present invention contemplates as one of its objects, the provision of a unitary valve device of exceedingly simple construction and few parts which automatically relieves internal and external pressure.

Another object of this invention resides in the provision of a valve of the character described which opens upon the attainment of a predetermined pressure within the tank to provide an air vent during the filling of the tank; and which is so designed that in the event the tank is filled to overflowing, the area of the vent opening is automatically increased without entailing any increase in pressure within the tank.

Another object of this invention is to provide a valve of the character described which may be latched in an open position if occasion demands.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which.

Referring now particularly to the accompanying drawings, in which like numerals indicate like parts, the numeral 5 designates a tank with which the valve device indicated generally by the numeral 6 is associated. Although the invention is concerned primarily with the venting of milk storage and transportation tanks, it is obvious that it is equally applicable to any tank requiring protection against bursting and collapsing due to forced filling and emptying of the tank.

Figure 1:
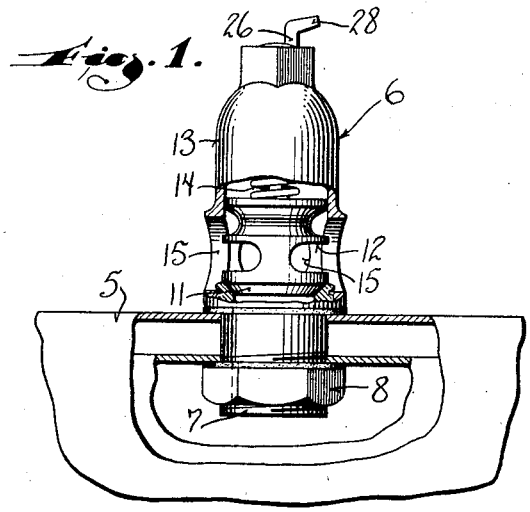
Figure 1 is a side elevational view of a valve constructed in accordance with this invention and illustrating its application to a jacketed tank, parts of the valve and tank wall being broken away and in section.

It is particularly useful in tanks of the jacketed type as illustrated in Figure 1 where openings in the tank wall should be as few as possible.

The valve device comprises a nipple-like sleeve 7 which may be considered as providing the base for the valve structure generally. This nipple-like sleeve is secured to the tank wall in any suitable manner. It may be permanently welded to the inner and outer shells of the tank or, as illustrated in Figure 1, it may be secured in position by a nut 8 threaded on the inner end of the sleeve.

The outer end of the sleeve has an enlarged externally threaded annular flange or neck 9. The inner peripheral edge of the nipple-like sleeve is chamfered to provide a valve seat 10 with which the chamfered lower edge 11 of a valve unit 12 engages.

The valve unit 12 is slidably received in a bonnet or hood 13 threaded to the neck 9. The valve unit is thus guided to move axially toward and from its closed position engaging the seat 11. A heavy coil spring 14 confined between the valve unit and the upper end of the bonnet yieldingly holds the valve unit down on the seat 10.

The lower portion of the bonnet has a plurality of ports 15 in its side wall so that when the valve unit is lifted from its seat the interior of the tank will be vented to the atmosphere.

The valve unit is substantially hollow or of skeletonized construction at least at its lower portion to provide a passageway therethrough and is provided with a valve seat 16 circumscribed by the chamfered portion 11.

Cooperating with the valve seat 16 is an inner valve 17, the stem 18 of which is slidably received in an axial bore 19 through the upper portion of the valve unit 12. At a distance above the top of the valve unit, the stem 18 has a collar 20 secured thereto which, in the present instance, consists of a spring ring snapped into a groove in the stem.

Figure 2:
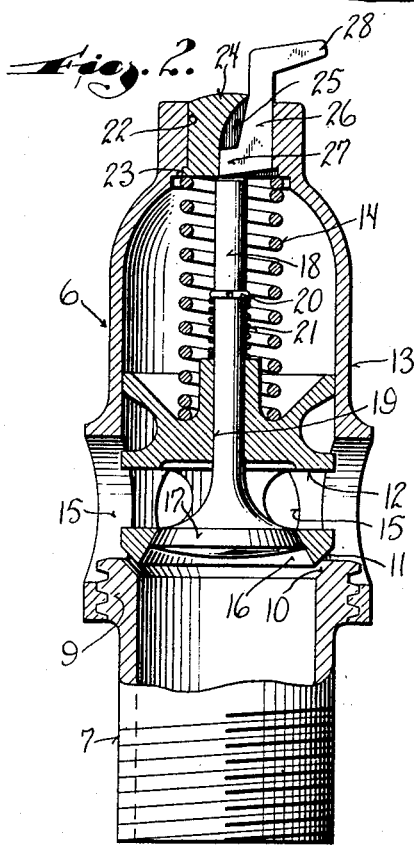
Figure 2 is an enlarged side view partly in longitudinal section through the valve device per se, said view showing the valve in its pressure releasing position.
Figure 3:
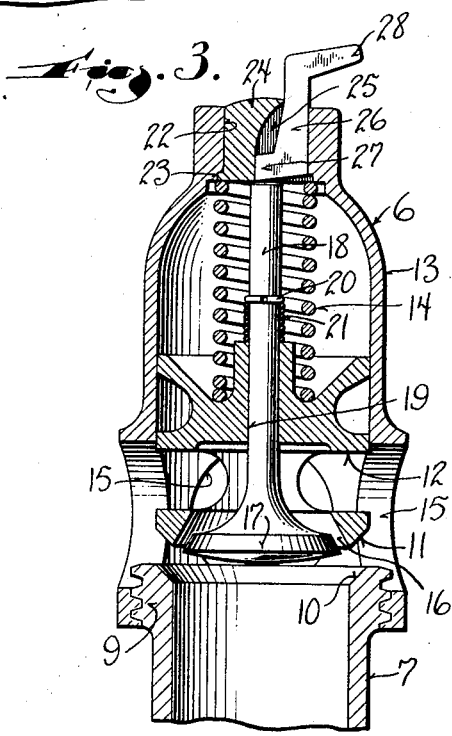
Figure 3 is a view similar to Figure 2 but illustrating the parts in the positions they occupy during augmented pressure release.

A light coil spring 21 encircling the valve stem is confined between this collar and the top of the valve unit to yieldingly hold the inner valve 17 on its seat 16. Hence, the inner valve and the valve unit 12 normally constitute a unit, and it is to be observed that the inner valve opens inwardly or downwardly so that in the event of internal pressure, the valve unit is lifted as shown in Figure 2.

Figure 4:
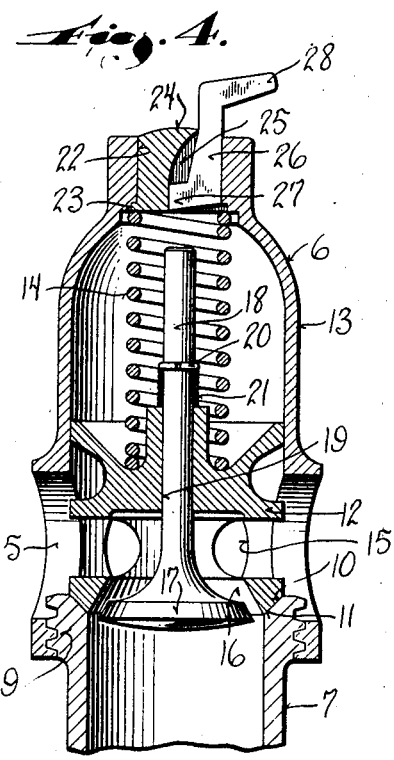
Figures 4 and 5 are views similar to Figure 3 showing respectively the positions of the parts during the vacuum prevention condition and the latched positive venting condition.

From this it will also appear that the development of sub-pressure within the tank will cause the inner valve to unseat as shown in Figure 4.

The upper end of the bonnet has a bore 22 axially therethrough with a counterbore 23 at the lower inner end thereof.

A plug 24 is readily removably seated in this bore, being supported against outward displacement by the engagement of a flange on the lower portion of the plug in the counter-bore 23. Downward or inward displacement of the plug is prevented by the engagement of the adjacent coils of the spring 14 with the undersurface of the plug.

Figure 5:
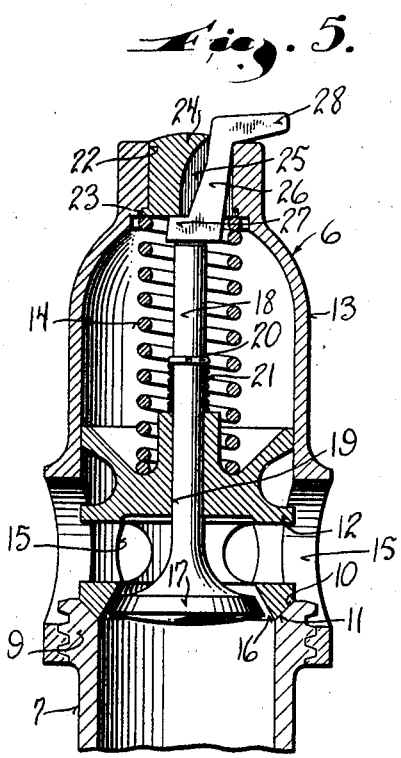
Figure 6:
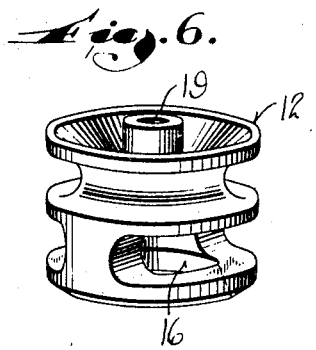
Figure 6 is a perspective view of the hollow ported valve unit which constitutes the main valve.

A radial slot 25 in one side of the plug has a latch 26 loosely mounted therein. This latch has flat opposite side walls and is of uniform thickness slightly less than the width of the slot 25. Its lower end has a toe portion 27 projecting therefrom, which is of such size and shape as to fit within the slot 25 in one position of the latch and to engage the undersurface of the plug in another position of the latch, as shown in Figure 5.

To facilitate shifting the latch from one position to the other, its outer end has a handle part 28 so formed that the latch may be said to have substantially the shape of the letter Z.

In its retracted position, the latch merely forms a continuation of the bottom wall of the plug 24. In this position there is no interference to closure of the inner valve unless the necessity for augmented pressure release is encountered. This situation might occur if the tank were being forcibly filled with liquid to the point of overflowing and at a rate in excess of the velocity at which the overflow could be accommodated through the pressure release opening shown in Figure 2.

Under such circumstances, the overflowing liquid would lift the valve unit; but the inner valve having been arrested against further upward movement by the engagement of its stem with the bottom of the plug, would not rise. Its consequent unseating would thus measurably increase the venting area.

In the event it becomes desirable to hold the valve open, the latch may be pushed down and rocked to its operative position shown in Figure 5. In so doing the lower end portion of the latch is interposed between the bottom of the plug and the upper end of the valve stem, thereby holding the inner valve off its seat 16.

From the foregoing description taken in connection with the accompanying drawings, it will be readily apparent that this invention provides a valve structure especially adapted for use in the dairy industry where stringent health requirements necessitate all apparatus to be so constructed that all portions thereof may be thoroughly cleansed and sterilized.

It will also be apparent that the valve structure of this invention consists of but a few parts so assembled that upon unscrewing the bonnet which is facilitated by having the upper end thereof formed as a hexagon or of other polygonal shape, the entire structure is disassembled.

In addition to this simplicity, it is apparent that the present invention has the advantage of combining a pressure release and vacuum preventing valve in one unitary structure necessitating only one hole through the wall of the tank.

What I claim as my invention is:

A safety valve of the character described comprising: an externally threaded nipple; a valve seat on the inner periphery of the nipple; an open-ended bonnet having one end threaded onto said nipple and having a port therein; a valve unit movable in the bonnet from a closed position seated on said valve seat to an open position uncovering said port upon motion of the valve unit toward the other end of the bonnet, said valve unit being readily removable from the bonnet upon detachment of the bonnet from the nipple by passing through the open threaded end of the bonnet, and said valve unit having a passage therethrough provided with a valve seat; a plug slidably fitting in the opening at the other end of the bonnet to close the same; means on the plug engaging the inner wall of the bonnet for preventing passage of the plug outwardly through said opening at the other end of the bonnet, said means readily permitting disassembly of the plug through the open-threaded end of the bonnet; a valve spring confined between the valve unit and the plug for yieldingly urging the valve unit to its closed position and for holding the plug in operative position closing the opening at said other end of the bonnet; a valve member arranged to engage the valve seat of the valve unit for closing the passageway therethrough; a stem on said valve member having its free end engageable with the plug during movement of the valve unit off its seat to thereby effect opening of the valve member and uncovering of said passageway; and manually operable latch means slidably received in a slot in the plug extending substantially axially therethrough, said latch means including a handle exposed on the exterior of the bonnet, and a part extending into the slot of the plug and adapted to be moved to a position interposed between the plug and the adjacent end of the valve member stem to hold the valve member in open position.

ARTHUR B. WEBB.